INVENTORS.
RICHARD J. KULDA,
RIMVYDAS A. KAMINSKAS,

BY Barlow + Lewis

3,313,152
FLIGHT CONTROL SYSTEM

Richard J. Kulda, Orange, and Rimvydas A. Kaminskas, Duarte, Calif., assignors to Giannini Controls Corporation, Los Angeles, Calif., a corporation of New York
Filed May 6, 1963, Ser. No. 277,992
21 Claims. (Cl. 73—178)

This invention has to do with the control of aircraft, particularly during specific maneuvers such as takeoff and approach operations.

The invention relates more especially to provision of a signal that represents desired pitch steering conditions. Such a signal may be displayed for the information of the pilot for use as a pitch steering signal, or may be supplied to an automatic control mechanism of any desired type for control of the pitch attitude of the aircraft. Such a signal may be employed alternatively for manual or automatic control of the speed or power setting of the aircraft, the pitch angle being controlled independently, for example to maintain a set altitude or glide path. Whereas the basic concept of providing a pitch steering signal for such purposes has been previously proposed, the present invention provides a signal having improved properties such as accuracy, flexibility and reliability.

The signal developed by the invention for the described purposes is derived primarily from a sensor that is responsive to changes in angle of attack of the aircraft. That sensor preferably measures angle of attack directly, and may be of known type. Alternatively, some features of the invention are obtainable with a primary sensor that responds to some function that depends jointly upon angle of attack and one or more other variables such as indicated airspeed, for example.

The signal from the primary sensor is modified in accordance with the invention in order to incorporate several distinct types of supplementary information. That modification of the primary signal involves measurement and utilization of auxiliary variables other than angle of attack; and also typically involves definite types of time control, whereby changing modes of control are accommodated during specified maneuvers, especially takeoff.

The invention is particularly useful in connection with large jet-powered aircraft, and will be described for clarity with primary reference to such aircraft. However, many aspects of the invention are useful for the control of aircraft of many different types.

A more particular object of the invention is to provide a suitable pitch steering command for use throughout the takeoff operation. For purposes of description, takeoff may be divided into successive phases, which are essentially distinct and include the ground run, during which pitch attitude $\theta$ and angle of attack $\alpha$ are essentially constant; the rotation, which is ordinarily initiated at a set speed $V_R$, and is normally carried out at a definite rotation rate to attain a predetermined value of angle of attack $\alpha_{LOF}$ for liftoff; the takeoff flare, during which the aircraft leaves the ground at a definite velocity $V_{LOF}$ and makes the transition from horizontal translation along the ground to steady state climbing flight at specified airspeed $V_2$; and the climbout, typically executed at constant angle of attack, speed and climb gradient $\gamma$.

Prior to liftoff, the system of the present invention typically presents to the pilot a pitch steering signal proportional to the difference between the existing angle of attack and the selected value $\alpha_{LOF}$ to be attained by rotation. That signal provides a positive reference signal during rotation, whereby the pilot simply continues rotation until the signal is brought to zero.

Following liftoff, the reference value for the angle of attack signal is automatically modified during the takeoff flare to produce smooth transition into a steady climb at the proper climb gradient for the existing conditions. The required airspeed $V_2$ for climbout is ordinarily specified as a definite fraction of the stall speed $V_S$. In conventional practice the pilot attains that speed by manipulating the elevator and referring to the airspeed indicator. However, after each change of aircraft inclination an appreciable time is required for the airspeed to change correspondingly, leading to a hunting action in which the pitch and angle of attack oscillate between too high and too low a value. Because such hunting is almost inevitable, safety requires that the specified airspeed for climbout be set sufficiently high to avoid any possibility of the angle of attack approaching the stall value $\alpha_S$.

By utilizing angle of attack as the primary control variable, the present invention avoids such oscillation and enables the pilot to go directly to the desired pitch angle. That is made possible because of the sample relationship between airspeed and angle of attack when each is expressed as a fraction of the stall value:

$$\frac{V_2}{V_s} = K\sqrt{\frac{\alpha_s}{\alpha_2}}$$

For a given flap setting the constant K and $\alpha_S$ are essentially fixed. Hence flying the proper definite value of $\alpha_2$ complies with the certificated requirements which are specified in terms of the ratio $V_2/V_S$. Not only does the angle of attack respond promptly to the pilot's pitch steering action, but the required value $\alpha_2$ is independent of the gross weight and center of gravity of the aircraft. On the other hand, when the primary reference variable depends upon speed, the variability of $V_2$ requires a gross adjustment for weight. Thus a particular advantage of the system of the present invention in the form in which angle of attack is utilized as primary reference variable is that it is capable of maintaining Airplane Flight Manual values, insofar as they represent Civil Air Regulations, throughout the takeoff operation. In particular, the system takes proper account of such variables as gross weight and flap position, accommodating their different effects at liftoff and after transition to climbout.

A particular object of the invention is to provide a gradual and progressive transition of the flight control signal between liftoff and climbout conditions, insuring smooth transition of the aircraft during that critical portion of the takeoff.

A further object of the invention is to facilitate performing the described transition at a rate that is suitable to the conditions of the particular flight. The invention in preferred form provides automatic modification of the rate of transition in accordance with the thrust to weight ratio of the aircraft. That ratio is sensed automatically, typically by means of an accelerometer, and the rate of transition is controlled accordingly. That feature tends to insure optimum transition for varying loading of the plane, and also accommodates such radical changes of thrust to weight ratio as result from loss of an engine during takeoff.

A further object of the invention is to assist the pilot in modifying the rate of rotation of the aircraft in accordance with the actual value of the thrust to weight ratio. In preferred form of the invention, that is accomplished by modification of the overall gain at which the steering command is presented to the pilot. In presence of a substantially normal value of thrust to weight ratio, the steering signal is presented with normal gain, so that prior to initiation of rotation the full value of the desired rotation angle is visible to the pilot. In response to that signal, he is accustomed to manipulating the elevator controls in such a way as to produce rotation at normal rate. In case of engine failure during takeoff, or if the thrust to weight ratio for any other reason drops to an abnormally low value, the invention automatically reduces the signal gain. The needle deflection presented to the pilot during rotation is then less than normal, which has been found to assist the pilot in producing the desired slower than normal rate of rotation. Completion of rotation is still indicated by nulling of the signal, and the final rotation angle attained is not altered by this change of gain. After rotation has been completed, the gain is preferably returned automatically to its normal value, for example in response to extension of the landing gear at takeoff.

A further aspect of the invention is to modify the pitch steering signal in such a way as to prevent the actual pitch angle from exceeding a desired limit. When the aircraft is steered during climbout to maintain a set speed, as in conventional practice when no pitch steering signal is available, extreme conditions such as high power and light load occasionally lead to excessively high pitch angles, which may be uncomfortable or unsafe. Moreover, in the effort to reduce the airspeed after it has exceeded the set limit, the angle of attack may momentarily reach a dangerously high value. The present invention eliminates the latter problem by utilizing angle of attack as the primary control variable. By suitable modification of the pitch steering signal, the invention also prevents excessive pitch angles without requiring any special adjustment or action by the pilot.

A further object of the invention is to produce a signal representing the pitch angle of an aircraft without reliance upon a pitch gyroscope or its equivalent. That is accomplished by joint action of a longitudinal accelerometer, which responds to the apparent acceleration parallel to the longitudinal axis of the aircraft, and an airspeed sensor. The longitudinal acceleration typically comprises two components: the actual rate of change of the speed of the aircraft, and the longitudinal component of gravity, which is proportional to the sine of the pitch angle of the aircraft. In accordance with the present aspect of the invention, a signal representing aircraft pitch is obtained from the accelerometer output essentially by subtracting the component due to rate of change of speed. A signal representing that quantity may be derived, for example, by differentiation of a conventional airspeed signal. The resulting pitch signal may be further shaped, for example to convert from the sine of the pitch angle to the angle itself. Such conversion is unnecessary for many purposes, including, for example, the function of pitch limitation already described. Such a system for sensing pitch angle is free of the well known disadvantages associated with gyroscopes, particularly the errors caused by the rapid changes of speed and attitude of the aircraft that accompany takeoff.

Another object of the invention is to provide a stall or buffet warning system that takes acount of variations in such variables as gross weight and flap position. In preferred form of this aspect of the invention, the critical angle of attack for production of the stall warning signal is separately settable for each discrete flap position, and automatic selecting means are provided for making effective the appropriate critical value under control of the flap mechanism.

A further aspect of the invention provides means for energizing the stall warning signal during rotation and prior to liftoff if the attitude of the aircraft approaches the pitch angle at which ventral contact is probable. That action is incorporated in a particularly effective and convenient manner in the stall warning system of the invention. For that purpose, an additional setting for ventral contact is provided, in parallel to those for the discrete flap positions, and the selection mechanism is modified in such a way that the critical reference value for the stall warning is derived from that additional setting prior to liftoff.

With that arrangement the stall warning device may be considered as a particular utilization device for a pitch steering signal of appropriate type, which is developed whenever the angle of attack exceeds the upper limit of the desired range. During the ground run and liftoff that limit is set in accordance with the aircraft geometry to avoid risk of ventral contact; and during climbout the limit is automatically shifted to a value determined in accordance with flight characteristics of the aircraft.

A further aspect of the invention provides during approach operations a pitch steering signal that represents essentially the departure of the angle of attack from a predetermined selected value. That selected value is typically different for each flap position and corresponds to the desired speed. For approach, the angle of attack is not directly controlled by the elevators in accordance with the control signal. Instead, the elevators are manipulated to maintain the aircraft on the desired glide path; and the control signal is employed as a guide for the airspeed, which is varied to null the signal, thereby producing the commanded angle of attack. A great advantage in that method of control is that it leads directly to a definite flight condition without requiring specific correction for gross weight, as would be the case if control were based on indicated airspeed or on any flight variable significantly dependent thereon.

A further aspect of the invention provides an adjustment for varying wind velocity, which compensates for the wind gradient as the aircraft approaches the ground. That adjustment is preferably applied in the form of a uniform bias added to the angle of attack signal. That bias causes the aircraft to fly at lower angle of attack and at higher speed, providing ample margin for safe control as the wind gradient is encountered. The magnitude of the wind bias is typically adjusted by the pilot in accordance with wind information from the control tower, and is preferably applied only when the system is in approach mode.

A further aspect of the invention provides automatic modification of the reference value of angle of attack during takeoff when the thrust to weight ratio drops significantly below normal, as when an engine is lost. Such modification may be employed, for example, to raise slightly the angle of attack at which the climbout is executed, thereby decreasing the speed. Whereas that control many not accord with present requirements, it it is illustrative of the modifications that are made possible by the present system and that may come to be considered advantageous once instrumentation for their execution is made available.

The system of the invention can readily be modified to include means for limiting the minimum speed at which the aircraft is flown to a value sufficiently high to insure proper control. For that purpose a signal is derived from the indicated airspeed sensor and is supplied to a difference circuit to develop the difference of the actual airspeed below the desired minimum. The resulting signal is combined with the angle of attack signal in such a way as to over-ride the latter in a direction to command a lower angle of attack than would otherwise be flown.

A full understanding of the invention and of its further objects and advantages will be had from the following description of certain illustrative manners of carrying it out. The particulars of that description, and of the accompanying drawings which form a part of it, are intended only as illustration of the invention, and not as a limitation upon its scope, which is defined in the appended claims.

Figure 1:
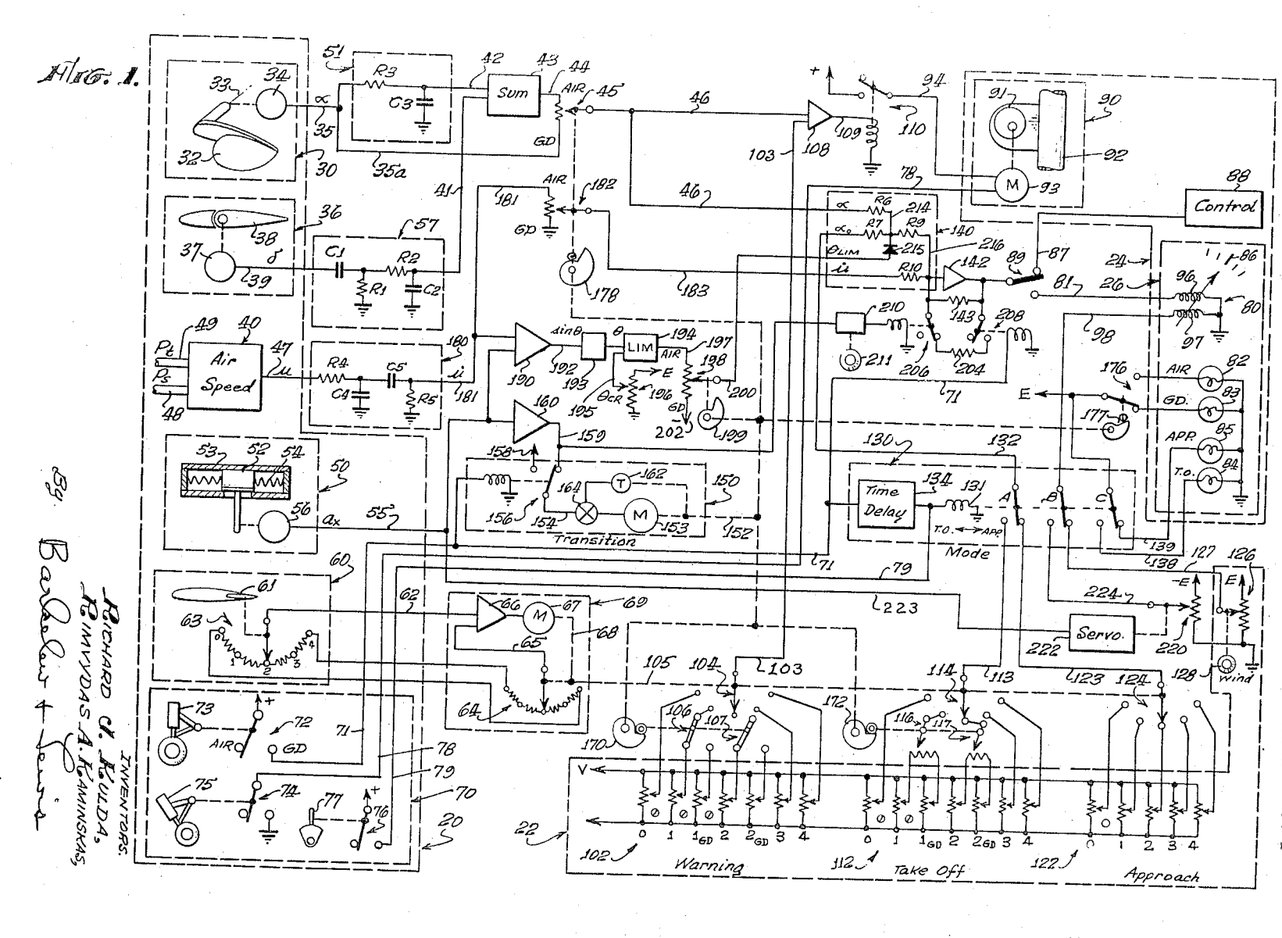
FIG. 1 is a schematic diagram representing an illustrative embodiment of the invention.

The illustrative system shown schematically in FIG. 1 comprises a plurality of sensing devices, indicated generally at 20, which are responsive to respective flight variables and/or aircraft conditions, and which develop signals representing those quantities; a plurality of manual control devices, indicated generally at 22, which are individually settable to represent flight variable values that are normal and desired or that are critical for certain conditions of flight; computing and control mechanism, shown generally in the central portion of FIG. 1, which responds to the input signals from sensors 20 and from control devices 22, and which develops one or more output signals that represent the relationship between the existing and the desired conditions of flight; and output devices, indicated generally at 24, for utilizing the derived output signals for control of the aircraft. Those output devices are shown illustratively as comprising automatic control devices of known construction as at 88, and the indicators 26 and 90 for informing the pilot of the flight relationships represented by the output signals. Indicator 26 is a visual proportional indicator which displays the magnitude of the primary output signal. Indicator 90 is an on-off device and warns the pilot when certain selected critical conditions are exceeded. Indicator 90 is typically a stick shaker, which may be of conventional type and may also produce an audible signal. The devices 26, 88 and 90 are illustrative of many known devices that may be employed for conveying information to the pilot or performing control functions.

*Flight-variable signals*

Of the sensors 20, the primary sensor 30 provides a signal on the line 35 representing a flight variable that varies with the coefficient of lift of the aircraft. In preferred form of the invention that variable is the angle of attack of the aircraft. Sensor 30 then typically comprises a conventional angle of attack vane, indicated at 32, pivotally mounted on a horizontal axis 33 transverse of the aircraft and exposed to the airstream at a suitable location, for example on one side of the fuselage forward of the wing. Vane 32 is coupled to a transducer 34, which produces on the line 35 a signal that represents the angle of vane 32. That angle is a definte function of angle of attack which is determined by flight tests for the particular vane location on the aircraft and including any variation due to ground effect when the aircraft is on or near the ground. The system is then designed to compensate for the actual response function of the vane output.

Transducer 34, and the other transducers to be described, may be of any suitable type, such as potentiometers, differential transformers, selsyn transmitters and the like. If the signal output of such a transducer comprises a modulated carrier frequency, suitable means are typically provided for demodulating the signal, as to facilitate filtering; and a direct current signal may be modulated, as to facilitate amplification. Such modulators and demodulators, as well as other conventional circuit elements such as phase adjusting means, are omitted from the present schematic showing for clarity of illustration.

Many advantages of the present invention can be obtained with a primary signal that represents a joint function of angle of attack and some other variable, such as indicated airspeed, for example. Such a relatively complex function may be sensed, for example, by means of a yieldingly biased vane extending forwardly from the leading edge of the wing and pivoted on a horizontal axis, as described in U.S. Patent 2,945,375. Reference in the present specification and claims to a signal responsive to angle of attack or to lift coefficient is intended to include signals of the general type developed by such a wing vane or similar device as well as signals that depend only upon angle of attack.

A particularly desirable mechanism for developing an angle of attack signal on line 35 utilizes one or more vanes such as 32 as primary sensor in combination with an auxiliary sensor responsive to changes in pitch angle of the aircraft. Such an auxiliary sensor is illustratively indicated at 36 in the form of a transducer 37 coupled mechanically to the aircraft elevator 38, or to the elevator control mechanism in such a way as to produce on the line 39 a signal that represents the elevator deflection. That signal is filtered to remove the zero and low frequency components as by the series capacitance C1 and shunt resistance R1, and is then effectively integrated, as by the shunt capacitance C2 and the series resistance R2. Since at high frequencies the elevator position may be considered proportional to the rate of change of pitch angle of the aircraft, the resulting signal on the line 41 provides a measure of the pitch angle variations, and hence of the variations in the angle of attacks that includes frequency components between a lower limit determined in known manner by the filter network C1, R1, and an upper limit, determined by the integrating network R2, C2.

The signal on line 35 from primary sensor 30 is severely filtered by the low pass filter 51 shown illustratively as the series resistor R3 and the shunt capacitance C3 to remove frequency components above a limiting frequency which is typically substantially equal to the lower limiting frequency of the auxiliary signal. That limit is chosen sufficiently low to cut out substantially all noise produced by sensor 30 as a result of turbulent condition of the atmosphere. The resulting noise-free signal on line 42 is summed with the auxiliary signal on line 41, by adding circuitry 43 of any suitable type, producing at 44 a composite signal of particularly advantageous form. That signal includes frequency components derived from the primary sensor extending from zero frequency up to the noise limit, and frequency components derived from the auxiliary sensor and extending from the noise limit up to the upper limit set by filter R2, C2. The latter limit is selected to provide adequate high frequency response for proper feel and accuracy. Yet the disturbing effect of air turbulence is practically eliminated. That method of obtaining a signal responsive to angle of attack is more fully described and claimed in the co-pending patent application Ser. No. 278,197, filed on May 6, 1963, by Rimvydas A. Kaminskas. Reference in the present specification and claims to an angle of attack or lift coefficient signal is to be understood as ordinarily including such a signal as is described in the above co-pending application.

When the aircraft is on the ground it is sufficient to utilize only the primary angle of attack signal, since the noise amplitude is then relatively low. That is also usually essential, since the auxiliary signal is subject to relatively wide variations at rotation. Such selection may be made by a switching device, shown as the potentiometer 45, which delivers to the line 46 either the signal on line 44 or that from line 35 via line 35a, or a continuously variable linear combination of those two signals. In accordance with the present invention, switching potentiometer 45 is operated automatically in response to liftoff, typically by the transition servo 150, to be described.

The sensor 40 produces a signal on the line 47 that represents the indicated airspeed $u$ of the aircraft. It may comprise an indicated airspeed computor of conventional form, responding to static and total pneumatic pressures, supplied from suitable orifices via the conduits 48 and 49, respectively.

The sensor 50 is responsive to acceleration $a_x$ parallel to the longitudinal axis of the aircraft. Sensor 50 typically comprises a mass 52 movable axially in a guide 53 parallel to the aircraft axis and yieldingly urged, as by the springs indicated at 54, toward an equilibrium, or zero acceleration, position. A transducer 56 is coupled to the mass and produces on the line 55 a signal that represents the departure of mass 52 from equilibrium position in response to forward acceleration of the aircraft.

The sensor 60 detects the position of the wing flaps 61 of the aircraft and controls a followup servo 69 which drives the shaft 68 to a definite position for each of the flap settings, designated 0 to 4 in FIG. 1. In the present embodiment, sensor 60 comprises a potentiometer 63 coupled directly to the wing flap itself or to the flap actuating mechanism, and producing on the line 62 a signal corresponding to the flap position. Shaft 68 is coupled to the balance potentiometer 64 and is driven by the followup servo motor 67 to such position that the signal developed on the line 65 by balance potentiometer 64 cancels the flap signal on line 62, balancing servo amplifier 66. The described use of a followup servo for driving flap position shaft 68 or its equivalent is illustrative of many known techniques that may be used for physically separating that shaft from the flap control mechanism. If such separation is not required, shaft 68 may be coupled mechanically directly to that mechanism. Sensor 60 may be considered to include the followup servo mechanism, though not so indicated in FIG. 1.

Sensor elements 70 comprise three switches, actuated by the aircraft structure or control mechanism. That actuation is illustrative of many other types of switch control that may be employed by the present invention for distinguishing flight conditions and the like.

A main oleo squat switch is indicated at 72. It is typically closed when the aircraft is on the ground, and opens when the main landing gear 73 extends on liftoff. Switch 72 thus distinguishes between ground and airborne conditions of the aircraft.

A second squat switch 74 is typically coupled to the nose landing gear 75 in such a way that it is closed when the aircraft is on the ground, and opens when the nose wheel lifts clear of the ground at the start of rotation. Switch 74 is like switch 72 in responding to the aircraft leaving the ground, but differs in the timing of switch actuation.

A throttle switch is indicated schematically at 76, coupled to the engine throttle controls 77 in such a way that the switch is actuated in one direction, typically to open position, only when the throttles are opened beyond some selected critical position, such as 80% of full power, which is ordinarily used only during takeoff or during go-around following a missed approach. Switch 76 then distinguishes between take-off and approach modes of flight.

*Output devices*

Output devices 24 comprise the meter assembly 26, the automatic control device 88 and the warning device 90, shown typically as a stick shaker. Indicator assembly 26 comprises a meter 80 responsive to variations in magnitude of an electrical signal supplied via the line 81. Meter 80 may be arranged in known manner to produce a non-linear or step-function response if desired, but normally a substantially linear response is preferred. Meter 80 carries a suitable fiduciary mark 86 to indicate normal or desired value of the input signal, so that the pilot can tell at a glance whether corrective action is required and how large a correction is called for. In addition to the main actuating winding 96, energized via line 81, meter 80 may have an auxiliary winding 97 which is energized via the line 98. Independent deflection components may then be produced by currents in the respective windings. Such structure may be employed to sum signal components of similar nature; or the auxiliary winding may be employed to provide an additive bias that is variable under special conditions, as for compensating wind or abnormal thrust, for example. Detailed interpretation of the meter indication under various flight conditions will be described below.

Indicator assembly 26 preferably also comprises means for indicating the mode of flight for which the system is set, for example whether for takeoff or approach and whether for airborne or ground operation. That is typically done by means of indicator lights 82, 83, 84 and 85, which automatically illuminate appropriate legends for the respective conditions. Those lights are selectively energized by respective switches in the mode selecting section of the control mechanism, to be described.

An alternative output or utilization device is indicated schematically at 88. That device is typically an automatic control mechanism of conventional type for regulating the aircraft power setting in such a way as to maintain equilibrium value of the input signal from the line 87. The switch 89 represents any desired manual or automatic switching device for selecting either indicator 26 or control apparatus 88 to receive the signal from amplifier 142, to be described.

A further output device 90 is operated in response to a separate input signal from the line 94 and produces a sensory warning to inform the pilot that the angle of attack or similar flight variable exceeds the desired range. As shown schematically at 90, that warning device is a stick shaker comprising an eccentrically rotating mass 91 mounted on the control column 92 and driven by an electric motor 93. Motor operation thus causes the control column to shake, attracting the pilot's attention. An audible signal may be incorporated in known manner as part of the stick shaker if desired. One terminal of motor 93 is preferably connected to ground via line 78 and nose oleo switch 74, already described, so that the stick shaker will not respond to spurious signals that may occur when the aircraft is on the ground. By coupling that action to the nose wheel rather than to the main landing gear, the stick shaker is rendered operative shortly after the start of rotation and before the main landing gear has left the ground, for reasons that will appear.

*Data signals*

The manual selection devices 22 are individually settable to develop definite respective voltage signals that represent selected values of flight variables or other quantities for predetermined conditions of operation. Each of those devices is preferably provided with a suitable legend to indicate the nature of the quantity selected, and with a scale on which the selected value can be read. In the present system the devices 22 comprise three groups of potentiometers 102, 112 and 122, which are supplied with suitable reference voltages. The wiper of each potentiometer taps a voltage signal corresponding to its set position, which is ordinarily permanently set at the time of installation of the system in the aircraft. Automatic switching circuits are provided for selecting one of those signals from each group of potentiometers, the selected signal corresponding to the existing flight conditions.

The potentiometers of group 102 are set, as by screwdriver adjustment, to provide signals that represent the value of angle of attack at which it is desired to produce a warning signal. When the aircraft is airborne, that warning signal typically indicates danger of stall or incipient buffet. However, the present system also provides a warning signal during rotation, which warns the pilot that a body angle has been reached at which there is risk of ventral contact with the runway surface. That warning signal is produced by the same device as the usual stall warning, typically a stick shaker, but at a value of angle of attack that is separately selected by one or more of the potentiometers 102, designated in the drawing by the flap position numeral with the subscript "GD."

The switching circuit for potentiometers 102 comprise the switch 104, which is driven in accordance with the flap positions 0 to 4, and the switches 106 and 107, which distinguish between airborne and ground operation. Those switches supply to the line 103 the signal from the appropriate one of the potentiometers 102. More specifically, the switch 104 is coupled by means indicated schematically at 105 to flap position shift 68, already described, and is thereby driven to that one of the switch contacts that corresponds to the existing flap setting of the aircraft. For selected flap positions further switching is performed by the respective switches 106 and 107, which are driven in tandem by the transition servo mechanism indicated generally at 150. As will be described more fully, that mechanism responds to transition of the aircraft from the ground run to airborne flight, and actuates switches 106 and 107 in definite timed relation to that transition. Such switching may be provided for as many flap positions as required, being shown illustratively for only the two positions represented by the numerals 1 and 2, which are typically the only flap positions employed for takeoff.

In view of the described switch operation, line 103 is connected to the wiper of the appropriate potentiometer for the existing flap setting and condition of operation, which wiper has been preset to derive a reference signal representing the desired critical value of angle of attack for that situation.

The resulting signal on line 103 is supplied as reference signal to the differential amplifier 108. That amplifier also receives the angle of attack signal frome lines 35, either via the line 35a or after summing with the δ signal at 43, as already described. The amplifier compares those two signals in known manner, providing an output voltage on the line 109 in response to a predetermined critical relation between the input signals, typically corresponding to the actual angle of attack exceeding the critical value set in at 102. The output voltage acts via the relay 110 to energize stick shaker 90, or any desired warning device, warning the pilot that a critical condition exists. Alternatively, relay 110 may actuate means of known type to perform any desired type of automatic control.

Returning now to manual control devices 22, the two sets of manually settable potentiometers indicated at 112 and 122 select reference values of angle of attack for use during takeoff and during approach modes of flight, respectively. The flap position selection switch 114 is driven as switch 104 and performs the similar function of connecting the line 113 to the one or more of potentiometers 112 that correspond to the existing flap position. Further selection is made for ground run or airborne condition by the potentiometers 116 and 117. Those potentiometers are driven from transition servo 150 and correspond in essential function to switches 106 and 107, already described. However, provision of potentiometers in place of the latter switches permits smooth transition of the reference values during transition from ground to airborne condition. The initial and final values are separately settable for each flap position, the initial values by the potentiometers designated by the flap position numeral with the subscript "GD." It will be understood that potentiometers 116 and 117 may be tapped if desired, and supplied at the taps with intermediate reference values obtained from additional potentiometers 112 provided for that purpose. Similar gradual transition may be obtained if desired by substituting potentiometers or equivalent devices for the switches 106 and 107, or for flap selection switches 104 and 114 and for other selection switches to be described.

The approach selection potentiometers 122 are connected to the output line 123 via the flap position selection switch 124, which is driven like switches 104 and 114. No ground-air selection is required, since the signal on line 124 is employed only during approach prior to touchdown.

To compensate for wind shear during landing, a wind signal is produced by means shown as the potentiometer 126, supplied with suitable reference voltage E. Potentiometer 126 is manually adjustable by the dial 128, which is calibrated in terms of wind speed. The potentiometer is typically set in accordance with wind information received from the control tower, and may be shaped to produce a signal having the desired functional relation to that wind speed.

*Mode selection*

Either the takeoff reference signal on line 113 or the approach reference signal on line 123 is selected automatically for supply to the line 132 and the summing device 140 in accordance with the mode of flight being executed. That selection is made in the present embodiment by the switch A of the mode selection relay 130. The relay winding 131 is energized via the line 71 from main landing gear switch 72 whenever the landing gear is compressed. A time delay device is provided, as indicated schematically at 134, to maintain relay energization for an appreciable time period, such as five minutes, for example, following opening of oleo switch 72. The system thus remains in takeoff condition for that set period after liftoff, allowing ample time for completion of climbout, and then shifts automatically to approach condition in preparation for landing.

In case of a missed approach the pilot applies power to climb and go around. It is then advantageous to have the reference signal shifted automatically to the appropriate value for climbout without requiring special attention from the pilot. For that purpose an alternative circuit via the line 79 is provided for energizing relay 130 under control of throttle switch 76, already described, insuring prompt return of the system to takeoff condition in response to advance of the throttles to substantially full power. Such control by throttle switch 76 or its equivalent may be employed to supplement control by the oleo switch, or may replace it.

Relay 130 includes the second switch B, which connects the line 98 to the output of wind potentiometer 126, already described, during approach mode, and to the automatically driven potentiometer 220, to be described, during takeoff mode of operation.

Relay 130 preferably includes a third switch C which supplies power from a source E to one or other of the lines 138 and 139 according as the system is in takeoff or approach mode. Those lines are connected to the signal lights 84 and 85, respectively, in indicator assembly 26, already described.

*Transition*

An important aspect of the present system is its ability to provide smooth transition between the conditions immediately following rotation and the constant flight conditions of climbout. That transition is largely controlled, in the present embodiment, by the transition servo 150 which acts in part as a timing mechanism. A transition output member 152, which will be referred to for convenience as a shaft, is reversibly driven at a controlled rate by the servo motor 153 between two positions which will be designated "ground" and "air" positions. Suitable limit switches or similar devices, not explicitly shown, may be provided for defining those positions. The motor drive is controlled by a control signal on the line 154, the derivation of which depends upon the position of the switch of relay 156. The winding of relay 156 is energized via the line 71 from main oleo switch 72, typically so that the relay is actuated when the aircraft is on the ground, and is released at liftoff.

Relay actuation supplies a control signal to line 154 from a source of any suitable type, indicated schematically at 158, which causes motor 153 to drive the transition shaft to its "ground" position and hold it there. After liftoff the control signal is received via the line 159 from the amplifier 160 and accelerometer 50. That signal causes motor 153 to drive shaft 152 to its "air" position at a rate that varies with the amplitude of the signal. That rate control is preferably obtained in known manner by use of a rate servo, with a tachometer generator 162 driven with motor 153 and supplying a signal that is subtracted from the input signal by the differential device 164. The rate of drive is then just sufficient to balance the input control signal. The action of the transition system is designed, by selection of suitable gear ratios, amplification or shaping of the control signal, and the like, so that with normal acceleration the full transition from ground to air position of shaft 152 occupies the appropriate time for transition for the aircraft in question, typically three to five seconds for a commercial jet transport, for example; and that the time is lengthened to the desired extent when the output signal from accelerometer 50 is less than normal. For example, in presence of reduced thrust to weight ratio such as may result from loss of an engine during takeoff, the desired transition time is typically approximately double that for a normal takeoff. By suitable shaping of the accelerometer signal, it is possible by normal design procedures to meet those conditions and also to produce the desired variation of transition time in response to smaller departures of the thrust to weight ratio from normal.

The output member 152 of transition servo 150 may be coupled to any desired switching or control devices, which then constitute control elements for imposing a desired transition function upon a flight control signal. Such control elements are illustratively shown as the selection switches 106 and 107 and the selection potentiometers 116 and 117, already described. As indicated in FIG. 1, shaft 152 typically drives the switches by means of a cam 170, which may be cut to produce switch actuation at any desired shaft position, that is, at any desired point of the transition cycle. Snap action of the switches can be obtained in known manner, as by suitable toggle mechanism, for example. Potentiometers 116 and 117 may also be driven via a cam or similar device, as indicated at 172, constituting shaping means which facilitate a wide variety of shaping of the transition between ground and air values of the reference signals from potentiometers 112. Such cam shaping may be supplemented or replaced by shaping of the windings of switching potentiometers 116 and 117.

Transition servo 150 typically also controls the "air" and "ground" indicating lights of indicator assembly 26. As shown, the switch 176 is coupled to transition shaft 152 via the cam 177, and supplies power from a source E to one or other of those lights in accordance with the shaft position. The simple double-throw switch indicated may be replaced by a wafer switch if desired, for example to energize both lights during a selected portion of the transition.

Modification of the angle of attack signal by severe filtering at 51 and summing at 43 with the auxiliary signal on line 41 has already been described as a useful procedure for reducing noise in the angle of attack signal when the aircraft is airborne. Switching potentiometer 45 selects for supply to line 46 either the modified signal from line 44 or the conventional angle of attack signal from line 35, producing a smooth transition between those conditions. A double-throw toggle switch may be substituted for the potentiometer if gradual transition is not required. The switching action is preferably controlled by transition servo 150 via a timing device, represented in the figure as the cam 178. That cam is typically shaped to produce switch actuation from "ground" to "air" position only toward the end of the transition period, when the aircraft has attained essentially the steady attitude for climbout and the elevator position angle is therefore close to equilibrium value. Switch 45 then remains in "air" position until after the aircraft is again on the ground. Additional illustrative selection functions of the transition servo are described below in connection with the modification of the angle of attack signal for phugoid damping, the development of a signal for limiting the pitch attitude of the aircraft during climbout, and the modification of the system gain under control of the thrust to weight ratio.

*Phugoid damping*

As already indicated, the angle of attack signal from line 46 is compared by adder 140 with the reference signal from line 132, and the resulting difference signal is displayed on indicator 80 for the pilot's guidance, or utilized directly for any desired control function at 88. That difference signal, however, is preferably modified to incorporate additional signal components which provide useful functions. The present system includes two such signal components, which are combined with the angle of attack signal by algebraic summing at 140.

One of those signal components represents the rate of change $\dot{u}$ of the indicated airspeed of the aircraft. Introduction of a $\dot{u}$ signal of suitable amplitude, and with polarity to oppose the angle of attack signal when $\dot{u}$ and $\alpha$ have the same sign, provides highly satisfactory damping of the long period oscillation known as the phugoid. That oscillation involves a slow variation in pitch $\theta$, speed $u$ and altitude. It does not involve any change in angle of attack, and therefore may occur when pitch steering is based entirely on an angle of attack signal. The phugoid might be controlled theoretically by a signal component derived from either pitch, speed or altitude. The present system has the advantage that the $\dot{u}$ signal has a substantially zero average value during steady state climb or descent and hence does not introduce an unknown bias.

In the present system the $\dot{u}$ signal is obtained from the airspeed signal on line 47, already described. The latter signal is shaped by the low pass filter comprising R4 and C4 to eliminate noise and high frequency components that are not required; and is differentiated by the differentiating network R5, C5. The time constants of both these network components are preferably quite large, that of the filter being typically of the order of a second, and that of the differentiating network typically several seconds. The resulting $\dot{u}$ signal from network 180 on the line 181 then reflects only the gradual variations of airspeed and is independent of rapid changes such as result from air turbulence. The $\dot{u}$ signal is subtracted from the angle of attack signal on line 46 at the adder circuit 140. These subtractively combined signals produce at indicator 80, or at the automatic control 88, a pitch steering signal that changes in a negative direction in response to a positive rate of change of airspeed during phugoid oscillation and changes in a positive direction in response to a negative rate of change of airspeed during phugoid oscillation. This allows a change in the angle of attack in the direction oposite to the direction of a change of the pitch steering signal to compensate for that in the pitch steering signal and to damp the phugoid oscillation.

Such damping is obtainable also with a signal on line 181 that represents some quantity that is a non-linear function of the rate of change of airspeed. For example, such a signal may represent the rate of change of dynamic pressure, $\dot{q}$. For producing such a signal, the sensor indicated at 40 may represent simply a differential capsule supplied with static and total pressure and driving a transducer of conventional type.

Indicator 80 or its equivalent, is preferably isolated from the phugoid damping signal during the ground run and takeoff transition. During that time the airspeed is required to change rapidly so that spurious command signals could result, and phugoid oscillations do not develop because of the short time involved. After completion of the transistion the airspeed has typically reached its equilibrium value for the climbout, so that the signal on line 181 represents only the relatively small variations associated with the phugoid. In the present embodiment such switching is provided by the potentiometer 182, which is connected as a variable attenuator with output on the line 183 and is controlled by transition servo 150 via a suitable timing control shown as cam 178, already described. A separate cam or other timing device may be provided. Potentiometer 182 grounds line 183 until transistion has been substantially completed, preventing any spurious signal from reaching adder 140. Near the end of transition, that ground is lifted, supplying the phugoid compensating component for summation with the other signal components for display at 80.

*Attitude limitation*

When climbout is executed in response to the pitch steering signal as thus far described, the inclination of the aircraft path, and hence also the pitch angle $\theta$ is steeper the greater the thrust to weight ratio. For maximum thrust and abnormally low gross weight of the aircraft this occasionally leads to a pitch angle which is inconvenient or otherwise undesirable. It is therefore preferred to limit the pitch angle automatically to acceptable values.

That is accomplished in the present system by combining with the pitch steering signal a component or bias which increases with the value of the thrust to weight ratio. That bias will be referred to as the $\theta_{LIM}$ signal. It is preferably arranged to remain zero up to a selected critical value of the thrust to weight ratio, which corresponds to a critical pitch angle $\theta_{CR}$ within the acceptable range; and to increase rapidly above that value. The bias is of polarity to be additive with the main signal for positive angle of attack. The effect of such a bias is to command a lower value of angle of attack than would otherwise be called for. The angle of climb is thereby decreased and the airspeed is correspondingly increased. After equilibrium is attained a relatively larger fraction of the available power is expended in overcoming drag rather than in gaining altitude. The described $\theta_{LIM}$ signal also tends to prevent the pilot from increasing the pitch angle excessively while correcting for excess speed that has been allowed to occur during climbout.

In preferred form of the present aspect of the invention, the $\theta_{LIM}$ signal is derived from the body-referenced accelerometer 50. The signal from that accelerometer is proportional to the apparent longitudinal acceleration $a_x$, and comprises two components: the rate of increase of longitudinal speed, $\dot{u}$, and the apparent longitudinal component of the acceleration of gravity, $g \sin \theta$. The present system obtains a signal proportional to $\sin \theta$ by subtracting from the $a_x$ signal on line 55 a signal that represents the rate of change of airspeed. That substration is performed by the summing amplifier 190, with output on the line 192. The $\dot{u}$ signal is typically obtained by differentiating the airspeed signal from airspeed computer 40, and in the present system is tapped directly from the line 181, already described. However, it will sometimes be preferable to provide filtering and differentiating circuits separate from those at 180 and typically in parallel therewith, for example to obtain a $\dot{u}$ signal that includes higher frequency components than are required of the signal on line 181.

The $\sin \theta$ signal on line 192 may be shaped by suitable circuits, indicated schematically at 193, to compensate for the difference between $\sin \theta$ and $\theta$. The resulting $\theta$ signal is then supplied to the comparison circuit indicated schematically at 194, which effectively subtracts from it a reference signal received on the line 195 from the manually adjustable potentiometer 196. That reference signal represents the critical value $\theta_{CR}$ at which attitude limitation is to be initiated. The output signal on the line 197 from comparison circuit 194 then represents essentially $\theta-\theta_{CR}$, and typically has the value zero when those two quantities are equal.

In adder circuitry 140, the $\alpha$ signal on line 46 and the angle of attack reference signal on line 132, denoted $\alpha_0$ in FIG. 1, are summed, as by the summing resistances R6 and R7, in a manner to give the difference between their absolute values, producing on the line 214 a signal that normally represents the departure of the existing angle of attack from the desired value. Adder 140 and associated circuitry may therefore be considered to comprise signal means for producing such a signal. The $\theta_{LIM}$ signal on line 200 is supplied to line 214 via the unidirectional device shown as the diode 215. The $\dot{u}$ signal on line 183 is then summed with the signal on line 214, as by the summing resistors R9 and R10, producing on the output line 216 a signal for supply to the amplifier 142. The desired relative effect of each of the component signals upon the composite input to the amplifier is readily controllable in known manner as by selection of the relative scales of the respective signals and the values of the summing resistances.

The polarity of diode 215 is illustrated for the case that a positive signal on line 214 represents $\alpha$ greater than $\alpha_0$, and that the $\theta_{LIM}$ signal is positive for $\theta$ greater than $\theta_{CR}$. For that case, diode 215 is poled to pass positive current from line 200 to line 214. The diode prevents the $\theta_{LIM}$ signal from reducing the potential at line 214; and the absence of a summing resistance in line 200 causes the $\theta_{LIM}$ signal, whenever it is more positive than the $\alpha$ signal, to over-ride the latter. Hence, if the pitch angle exceeds $\theta_{CR}$ the command signal at line 214 is always positive, so that to null the signal the pilot must reduce the angle of attack. If the pitch angle is less than $\theta_{CR}$ but close to it, and if $\alpha$ is less than $\alpha_0$ by a larger difference, the $\theta_{LIM}$ signal also makes the voltage at 214 less negative than it would otherwise be. The pilot is thereby encouraged, in correcting $\alpha$, to approach $\alpha_0$ more gradually, reducing the chance that he will over-correct and produce an excessive pitch angle.

When the $\theta_{LIM}$ signal is combined with the $\alpha$ signal in the manner just described, it may be supplied directly to the adder throughout the takeoff. However, it is ordinarily preferable to maintain the command signal independent of the $\theta_{LIM}$ signal during the ground run, the rotation and at least a major portion of the transition, and to blend in the $\theta_{LIM}$ signal, typically under control of transition servo 150, as the transition is completed. In the present system such blending is accomplished by the switching potentiometer 198, which is connected as a variable attenuator and is driven from transition servo 150 via timing mechanism shown illustratively as the cam 199. The "ground" end of potentiometer 198 is preferably connected to a source of negative bias, as indicated at 202. Then, when the potentiometer is at "ground" position, the signal on line 200 is always more negative than the $\alpha-\alpha_0$ signal at line 214 of adder 140 and has no effect on the command signal. As potentiometer 198 is driven to "air" position during the latter portion of the transition, the signal on line 200 gradually shifts from that negative bias to a value determined by $\theta-\theta_{CR}$.

*Minimum control speed*

For some aircraft under special conditions, the stall speed is less than the speed $V_{MC}$ required for minimum control of the aircraft. To prevent the airspeed from dropping below $V_{MC}$ during the approach mode, it is sometimes desirable to provide an additional signal component which is normally zero but increases rapidly as the indicated airspeed drops below $V_{MC}$, or below some selected airspeed closely related thereto. Such a signal can be developed by comparison of the indicated airspeed signal on line 47 with a reference potential developed for the purpose, essentially as has been described for comparison device 194 except for polarity of the comparison. The resulting signal may be combined with the command signal at adder 140 in the same manner already described for the $\theta_{LIM}$ signal, so that it will over-ride the $\alpha$ signal and cause the pilot to fly a smaller value of angle of attack as the indicated airspeed approaches or drops below the minimum control speed. A switching system, which may be similar to potentiometer 198, is preferably provided to prevent supply of a $V_{MC}$ signal during the ground run and transition; or such a switching device may be controlled by mode selecting relay 132 to supply the $V_{MC}$ signal only during approach mode of operation. The instrumentation for supplying the $V_{MC}$ signal is omitted from FIG. 1 for clarity of illustration, since it may be closely similar to that shown for the $\theta_{LIM}$ signal. Other limiting conditions may be imposed upon the flight control system in similar manner as may be desired.

*Wind shear compensation*

During "approach" mode of operation the manually set wind signal on line 127 from potentiometer 126, already described, is supplied via switch B of mode selection relay 130 to line 98 and the auxiliary winding 97 of indicator meter 80. The polarity is so arranged that the wind signal increases the angle of attack indication, thereby causing the pilot to fly at a lower angle of attack under given conditions than he otherwise would do. An extra margin of speed and angle of attack is thereby provided, which facilitates maintenance of the desired glide path as the ground is approached and the wind decreases in velocity due to wind shear.

*Engine loss on takeoff*

The present illustrative system provides three distinct types of automatic accommodation for the accidental loss of engine power during takeoff. One or more of those functions may be omitted without destroying the utility of the others. As illustrated, those functions are controlled by accelerometer 50 responsive to longitudinal acceleration. However, one or more of the functions might be controlled by a signal of different type, for example a signal derived by averaging the outputs of the thrust meters for the respective engines.

Modification of the rate of transition in accordance with the accelerometer signal has already been described in connection with transition servo 150.

The acceleration signal also controls the overall gain with which the angle of attack signal is displayed on meter 80. That is typically accomplished by variation of the negative feedback circuit of amplifier 142, shown as the resistance 143. A shunt circuit is provided across that resistance and including in series the auxiliary resistance 204 and the switches of the two relays 206 and 208. The winding of relay 206 is energized under control of the acceleration signal from accelerometer 50. That signal is typically taken from the output of amplifier 160, and is supplied to the differential amplifier, shown schematically at 210, which acts essentially as a switch to energize relay 206 whenever the input signal exceeds a predetermined threshold value. That threshold is selected to correspond to aircraft acceleration between the range of normal takeoff and the range for acceleration with one engine out. Thus, relay 260 is energized during normal takeoffs, and is released, as shown, only in response to loss of an engine. Differential device 210 may, if desired, be provided with a manual or other adjustment, as indicated schematically at 211, for example to compensate major variations in gross weight of the aircraft. Ordinarily, however, such adjustment is not required. The winding of relay 208 is energized via the line 71 from main oleo switch 72. The relay is thereby actuated only when the aircraft is on the ground, and is released to open the relay switch, as shown, on liftoff.

With that dual control of the shunt circuit, auxiliary resistance 204 is inserted in parallel with 143 in response to loss of an engine during takeoff, but only prior to liftoff. The result is to reduce the deflection of meter 80 from its null position by a fraction that is variable in known manner by selection of resistances 143 and 204, and may typically be about 50%. During the ground run the meter deflection represents the angle of attack which is to be attained on rotation. By presenting that value to the pilot with less than normal amplitude, the pilot naturally carries out rotation less rapidly than normal. That has the advantage of allowing more time for the aircraft to attain sufficient air speed for takeoff before completion of rotation. However, the angle of attack reached by rotation is not altered by the control circuitry just described, since that value corresponds to null reading of the indicator, which is not affected by the degree of signal amplification. Immediately after liftoff, while the indicator is typically still at null value, relay 208 releases, restoring normal amplification, so that accuracy of control during transition and climbout is not affected.

A third type of compensation for engine loss on takeoff is provided by potentiometer 220, which produces on the line 224 a bias signal for supply to auxiliary winding 97 of indicator 80. The potentiometer is supplied with suitable reference voltage, shown as $-E$, and is driven by the servo followup device shown schematically at 222. That servo device receives a control signal via the line 223 from accelerometer 50, and may comprise a conventional followup servo which drives an output shaft in correspondence to the magnitude of the input signal. The output shaft is coupled to potentiometer 220 in such a way as to maintain the potentiometer wiper at the grounded end of the winding during normal takeoff acceleration, and to drive the wiper toward progressively higher negative voltages as the acceleration falls into the region characteristic of engine-out power. The resulting bias signal from the potentiometer is supplied to indicator 80 via switch B of mode selection relay 130 only when the system is in "takeoff" mode. That signal is of opposite polarity to the wind correction signal supplied as meter bias from wind potentiometer 126 when the system is in "approach" mode. That polarity difference is indicated by the opposite signs of the reference voltage applied to the respective potentiometer windings. The bias during takeoff therefore causes meter 80 to read as if the angle of attack were less than its true value. In nulling the meter, the pilot therefore flies a somewhat higher angle of attack than normal. By thus enabling takeoff and climbout at correspondingly lower airspeed than normal, the system makes maximum use of the limited power available.

*Modifications*

Figure 2:
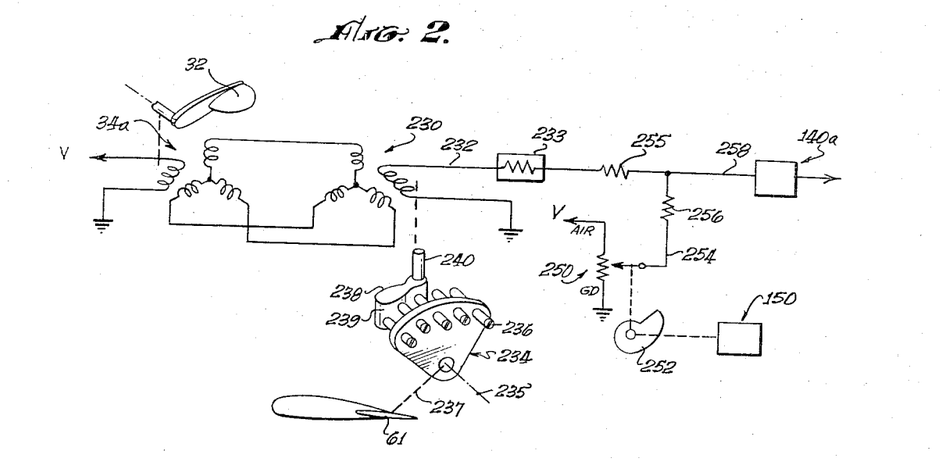
FIG. 2 is a fragmentary schematic diagram illustrating a modification.

FIG. 2 illustrates in fragmentary form a modification of the system of FIG. 1, wherein the reference value of the angle of attack is introduced at a different point of the system. Angle of attack transducer 34a, to which sensor 32 is coupled, comprises a synchro transmitter energized with alternating current from a source V. Transmitter 34a is electrically connected to the control transformer 230 with output on the line 232. The output signal may be demodulated, as required, for example at 233. The rotor of transformer 230 is driven in predetermined relation to the flap position by means shown as the cam structure 234. Cam 234 is journaled on the axis 235 and is coupled as at 237 to the flap or its positioning mechanism either directly or via a followup system such as that of FIG. 1. Cam 234 typically comprises a sector having individually adjustable, self-locking screws 236 the ends of which serve as cam faces for the respective flap positions. The cam follower 238 drives the shaft 240 and is positioned by engaging the end of one or more of the screws 236. The working face 239 of the cam follower is preferably formed so that its movement is essentially continuous as the cam rotates; and the follower position is definitely defined for each cam position.

Cam assembly 234 and its coupling mechanisms are designed and adjusted so that the output on line 232 from control transformer 230 represents directly the difference between the actual angle of attack, sensed by synchro 34a, and the reference value, represened by the rotary position of the control transformer. The output on line 232 therefore corresponds functionally to the difference of two distinct signals in the system of FIG. 1, the angle of attack signal on line 35 and the reference angle of attack signal on line 132, which are summed in adder 140.

In the system of FIG. 2 the required modification of the reference value of angle of attack during transition at takeoff may be essentially the same for all flap settings that are commonly employed for takeoff. When that is the case, a transition signal can be developed under control of the transition servo 150 (FIG. 1). For example, the potentiometer 250 of FIG. 2 is supplied with a suitable reference voltage V and is driven from transition servo 150 via suitable timing mechanism, represented as the cam 252. The output signal from potentiometer 250 on the line 254 is summed with the signal on line 232, as by the summing resistances 255 and 256. The resulting signal on the line 258 then includes a variable bias derived from potentiometer 250. That bias is typically zero in "ground" position of the potentiometer. After completion of transition the potentiometer is at "air" position and supplies the full bias, which is arranged to correspond to the desired modification of angle of attack between liftoff and climbout conditions. Thus, the bias imposed on line 258 from potentiometer 250 after transition typically corresponds to the difference between liftoff and climbout values of the angle of attack reference signals produced in FIG. 1 by potentiometer 112.

An angle of attack signal for control of a warning device such as the stick shaker 90 of FIG. 1 can also be derived in accordance with FIG. 2. For example, an independent control transformer similar to 230 may be driven in accordance with the flap position by a separately adjustable cam and connected in parallel with transformer 230 to the output of synchro 34a. Or, in some aircraft, it will be sufficient to employ the same control transformer, or even the same transition bias, for both warning and control signal generation.

The signal may then be tapped from line 232 in FIG. 2, or even from line 258, and summed with a suitable bias that represents the difference between the desired angle of attack and the limiting angle beyond which a warning signal is desired. That sum may be further modified by a separately developed transition bias when necessary.

In deriving a pitch steering signal from angle of attack as the primary flight variable, it is often desirable to provide two independent angle of attack sensors in positions on the aircraft where they will be oppositely affected by deviations from normal flight such as side slip. Such sensors may, for example, be mounted on opposite sides of the fuselage. The outputs of the two sensors may be averaged, as by suitable circuitry of known type, to produce an angle of attack signal. It is preferred, however, to combine the two signals in such a way that the angle of attack signal will correspond essentially to the output of whichever sensor is exposed to the larger apparent angle of attack.

Figure 3:
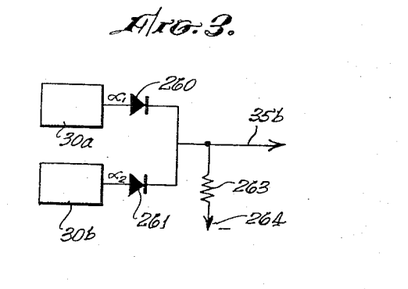
FIG. 3 is a fragmentary schematic diagram illustrating a further modification.

An illustrative circuit for that purpose is shown schematically in FIG. 3. The two angle of attack sensors 30a and 30b may be of any suitable type, mounted typically on opposite sides of the fuselage, with direct current outputs $\alpha_1$ and $\alpha_2$ which increase with the apparent angles of attack at the respective sensors. Those outputs are passed through unidirectional devices, shown as the diodes 260 and 261, respectively, to a junction at output line 35b. That line is connected via the resistance 263 to a source of negative bias, indicated at 264. The sensor assembly of FIG. 3 may then be substituted for sensor 30 of FIG. 1, line 35b taking the place of line 35 in that figure.

With an arrangement of the described type, the angle of attack signal under conditions of side slip corresponds to a value that is higher than the average angle of attack for the aircraft as a whole, leading to a more conservative situation. In the present system, that arrangement typically produces at indicator 80 a needle position calling for reduction of the angle of attack in presence of slip; and if the angle of attack is nearly at the selected upper limiting value, stall warning device 90 is energized in response to slip. In both those respects, the flight control action is made more conservative and safe.

It is to be understood that many changes can be made in the particulars of the illustrative system that has been described. In particular, the various signals may be produced by transducers of any suitable type, and may in general be of either alternating or direct current form and may be modulated or demodulated to shift that form. Shaping circuits for such signals may be provided as required to obtain desired functional response. The relative amplitude of such signals may be modified by provision of suitable amplifiers having either fixed or variable gain; and the phase of the signals may be adjusted in known manner to produce or maintain desired phase relation with respect to each other or to a reference phase. Switching operations may be performed by many different types of switching device, including conventional mechanically or electromagnetically operated switches, solid state switching devices and continuously variable devices such as potentiometers, for example. Many types of devices are well known for summing or comparing a plurality of signals, which may be adjusted in known manner as to polarity or phase to produce addition or subtraction as required.

We claim:
1. A system for producing a pitch steering signal for an aircraft during takeoff, comprising the combination of
  sensing means responsive to a flight variable that is a function of the angle of attack of the aircraft,
  signal means acting under control of the sensing means to produce a signal indicative of deviation of the variable from a selected reference value, said signal means having a first condition corresponding to a first selected reference value of said variable adapted for liftoff and having a second condition corresponding to a second selected reference value of said variable adapted for climbout,
  means for putting the signal means in its first condition prior to liftoff,
  and transition means acting automatically to shift the signal means to its second condition subsequent to liftoff and prior to climbout.

2. A system as defined in claim 1 and wherein said transition means comprises timing means actuated in response to liftoff of the aircraft and means acting to put the signal means in its second condition under control of the timing means and in definite time relation to the actuation thereof.

3. A system for producing a pitch steering signal for an aircraft during takeoff, comprising the combination of
  sensing means responsive to a flight variable that is a function of the angle of attack of the aircraft,
  a control element movable between first and second positions,
  signal means responsive to the sensing means and to the control element and acting to produce a signal indicative of deviation of the variable from a first selected value when the control element is in its first position and to produce a signal indicative of deviation of the variable from a second selected value when the control element is in its second position,
  means for putting the control element in its first position prior to liftoff,
  and transition means acting automatically in response to liftoff to drive the element progressively at a controlled rate of drive from its first to its second position.

4. A system as defined in claim 3, and wherein said transition means includes means for varying said rate of drive.

5. A system as defined in claim 3, and including also second sensing means responsive to variations in the thrust to load ratio of the aircraft,
  and means acting under control of the second sensing means to vary said drive rate of the transition means.

6. A system for producing a pitch steering signal for an aircraft during takeoff, comprising the combination of means for developing a primary signal corresponding to the existing value of a flight variable that is a function of the angle of attack of the aircraft, comparison means acting to compare the primary signal with a reference signal and to produce a pitch steering signal responsive to their difference, independently adjustable means for developing first and second data signals, the first data signal corresponding to a selected value of the flight variable adapted for liftoff and the second data signal corresponding to a selected value of the flight variable adapted for climbout, and transition means actuable to supply the first data signal as the reference signal to the comparison means prior to liftoff, and to supply the second data signal as reference signal to the comparison means subsequent to liftoff and during climbout.

7. A system as defined in claim 6 and including means responsive to the position of the wing flaps of the aircraft, at least one of said independently adjustable means comprising means for producing a plurality of different data signals which are separately adjustable, and means acting automatically under control of said flap responsive means to select one of said plurality of data signals for supply to the comparison means.

8. A system as defined in claim 6 and wherein said transition means comprises shaping means acting under joint control of the first and second data signals to produce a control signal, said shaping means being drivable to cause the control signal to vary continuously from a value corresponding to the first data signal to a value corresponding to the second data signal, means for supplying the control signal as reference signal to the comparison means, and means for driving the ratio means progressively at a controlled rate of drive in response to liftoff of the aircraft.

9. A system for producing a pitch steering signal for an aircraft during takeoff, comprising the combination of means for developing a primary signal corresponding to the existing value of a flight variable that is a function of the angle of attack of the aircraft, means for producing a reference signal representing a reference value of said flight variable, comparison means acting to compare the primary signal with the reference signal and to produce a pitch steering signal responsive to their difference, means actuable to modify the value of at least one of said signals in accordance with the difference in reference value of said flight variable between liftoff and climbout conditions of flight, and transition means for actuating the last said means in response to liftoff of the aircraft.

10. A system as defined in claim 9, and wherein said signal modifying means is actuable to develop a bias signal corresponding to said difference in reference value of the flight variable and to sum the same with said one signal.

11. A system as defined in claim 9, and wherein said reference signal producing means comprise means for producing two reference signals whose difference corresponds to said difference in reference value of the flight variable, and said signal modifying means is actuable to supply the reference signals selectively to said comparison means.

12. An aircraft warning system comprising in combination means for developing a primary signal corresponding to the existing value of a flight variable that is a function of the angle of attack of the aircraft, comparison means acting to compare the primary signal with a reference signal and to produce a sensory warning signal in response to a predetermined relation therebetween, means for developing a first data signal which represents a value of said flight variable at which there is danger of ventral contact during liftoff, means for developing a second data signal that represents a value of said flight variable at which there is danger of stall during steady flight, means actuable to supply the first data signal as reference signal to the comparison means during the ground run, and transition means actuable in response to liftoff to supply the second data signal as reference signal to the comparison means.

13. An aircraft warning system as defined in claim 12, and wherein said transition means is actuable in response to liftoff only after a predetermined delay time.

14. A system for producing a pitch steering signal for an aircraft, comprising the combination of means responsive to the angle of attack of the aircraft and acting to produce a first signal essentially representing the deviation from normal value thereof, means for producing a second signal representing the rate of change of the indicated airspeed of the aircraft, means for summing said signals in such polarity that the second signal opposes the first signal when the rate of change of indicated airspeed and the angle of attack have the same sign, means acting to derive a pitch steering signal from the signal sum, and means for producing a third signal that represents essentially the excess of the pitch angle of the aircraft over a selected critical value, means acting under control of the third signal to modify said pitch steering signal in the direction corresponding to increased angle of attack.

15. A system as defined in claim 14, and including also means acting to disable said modification of the pitch steering signal prior to liftoff and for a predetermined time thereafter.

16. In an aircraft control system, means for producing a pitch signal representing the pitch angle of the aircraft, said means comprising in combination first sensing means responsive to the longitudinal acceleration of the aircraft and acting to produce a first signal representing said acceleration, second sensing means responsive to the speed of the aircraft, means controlled by the second sensing means for producing a second signal representing the rate of change of the speed of the aircraft, and means for producing a pitch signal responsive to the difference of said first and second signals and substantially proportional to the sine of the pitch angle.

17. A system for control of an aircraft during takeoff, comprising the combination of signal means for producing a first signal responsive to the value of a flight variable that is a function of the angle of attack of the aircraft, said signal representing the deviation of said flight variable from the value desired at completion of rotation, means for displaying the amplitude of said signal with a predetermined normal gain for guidance of the pilot during rotation, thrust responsive means for detecting loss of an engine during takeoff, and means controlled by the thrust responsive means for reducing the gain with which the signal amplitude is displayed to the pilot.

18. A system as defined in claim 17, and wherein said signal means includes means for modifying the signal in response to liftoff to represent the deviation of said flight variable from the value desired during climbout, and including also means for restoring said signal gain to normal value in response to liftoff.

19. A system for producing a pitch steering signal for an aircraft during takeoff, comprising the combination of means for producing a first signal responsive to the value of a flight variable that is a function of the angle of attack of the aircraft, means for producing a second signal that represents changes of pitch angle of the aircraft within a limited frequency range, means actuable to remove from the first signal frequency components within said frequency range and sum the resulting filtered first signal with the second signal to produce a composite signal, switching means actuable to select as primary pitch steering signal either said first signal or said composite signal, and means for actuating the switching means in timed relation to liftoff of the aircraft.

20. A system for producing a pitch steering signal for an aircraft for use during steady state climb and descent to damp phugoid oscillation of the aircraft, comprising the combination of means responsive to the angle of attack of the aircraft and acting to produce a first signal representing the value thereof, means for producing a second signal representing the rate of change of the indicated airspeed of the aircraft, means for combining said signals in such polarity that the second signal opposes the first signal when the rate of change of indicated airspeed and the angle of attack have the same sign, and means acting to derive from the combined signal a pitch steering signal that changes in a negative direction in response to a positive rate of change of airspeed during phugoid oscillation and changes in a positive direction in response to a negative rate of change of airspeed during phugoid oscillation, so as to allow a change in the angle of attack in the direction opposite to the direction of a change of the pitch steering signal to compensate for that change in the pitch steering signal and to damp the phugoid oscillation.

21. A system as defined in claim 20, and including also means acting to disable said combining means prior to liftoff and for a predetermined time thereafter.

References Cited by the Examiner

UNITED STATES PATENTS

| | | | |
|---|---|---|---|
| 2,193,077 | 3/1940 | Saxman | 73—180 |
| 2,896,145 | 7/1959 | Snodgrass | 73—178 X |
| 2,945,375 | 7/1960 | Greene et al. | 73—178 |
| 3,043,540 | 7/1962 | Greene | 73—178 X |
| 3,052,122 | 9/1962 | Westerback | 73—178 |
| 3,112,905 | 12/1963 | Greene | 73—178 X |
| 3,148,540 | 9/1964 | Gold | 73—178 |
| 3,200,642 | 8/1965 | Neuedorff et al. | 73—178 |

LOUIS R. PRINCE, *Primary Examiner.*